Patented Dec. 14, 1948

2,456,173

UNITED STATES PATENT OFFICE 2,456,173

PHOTOCHLORINATION OF ACETYLENE

Oliver W. Cass, Niagara Falls, N. Y., assignor to E. I. du Pont de Nemours & Company, Wilmington, Del., a corporation of Delaware No Drawing. Application May 30, 1945, Serial No. 596,809

6 Claims. (Cl. 204—163)

This invention relates to chlorination of acetylene under conditions leading to the formation of a mixture of valuable chlorohydrocarbons. More specifically, it relates to the reaction of chlorine with acetylene to form not only the expected addition product, namely acetylene tetrachloride (symmetrical tetrachlorethane) but also relatively large amounts of two other valuable chlorohydrocarbons, namely pentachlorethane and beta-trichlorethane.

Pentachlorethane is ordinarily prepared by a series of reactions involving the chlorination of acetylene to acetylene tetrachloride, reaction of acetylene tetrachloride with lime to form trichlorethylene and chlorination of trichlorethylene to pentachlorethane. Beta-trichlorethane is made by a series of reactions starting either with acetylene and involving the formation and subsequent chlorination of vinyl chloride; or with ethylene, involving the formation and subsequent chlorination of ethylene dichloride.

Previous processes for the preparation of the above two hydrocarbons have therefore been multi-stage processes involving isolation and, in some cases, purification of the intermediates involved. As is well known, very large quantities of acetylene tetrachloride are manufactured by the chlorination of acetylene. Heretofore, there has been no suitable commercial method for chlorinating acetylene to produce pentachlorethane and beta-trichlorethane.

It has been previously proposed to catalyze the addition of chlorine to acetylene by means of various devices, such as added catalytic materials or actinic radiation. For example, U. S. P. 908,051 discloses that "good quantitative yields" of acetylene tetrachloride may be secured by following the teaching of this patent which involves "suitable contact substances or by the action of light" in the vapor phase. In U. S. P. 1,030,916, it is disclosed that acetylene and chlorine react to form acetylene tetrachloride in the presence of "such means as are capable of accelerating chemical reactions ... such as iron ... without the presence of any foreign body as diluting agent." According to the teaching of this patent, the acetylene tetrachloride is obtained in a pure state by only washing and distillation. While the prior art has, therefore, recognized the possibility of activating the reaction between acetylene and chlorine by means of light, the teaching of this art gives no indication that materials other than acetylene tetrachloride can be produced by the operation of such a process. In fact, one of the advantages claimed for the process disclosed in the above patents is the purity of the acetylene tetrachloride thus produced. In the ordinary commercial method for chlorinating acetylene, which is carried out by passing chlorine and acetylene into liquid acetylene tetrachloride containing suspended iron chloride as catalyst and in the absence of light, little or no trichlorethane or pentachlorethane is formed.

In view of the above prior art, I therefore consider it unexpected and non-obvious that the reaction between acetylene and chlorine could be controlled so as to give acetylene tetrachloride in yields of less than 50% by weight in the reaction product, accompanied by high yields of two other valuable chlorohydrocarbons, at present commercially made by much more complicated reactions, namely pentachlorethane and beta-trichlorethane.

An object of the present invention is to provide an improved method for chlorination of acetylene. Another object is to produce pentachlorethane and beta-trichlorethane in good yield by the chlorination of acetylene. Other objects will be apparent from the description of the invention.

The essential feature of this invention lies in the discovery that acetylene and chlorine may be caused to react in the presence of light and in the absence of substantial quantities of oxygen and of catalytic substances, not only to form the expected addition product, but also the other two chlorohydrocarbons mentioned above.

In order to secure the results of my invention, I may react acetylene with chlorine in the approximate molar ratio of 1:2 in a liquid medium which ordinarily consists of the products of the reaction, while such a liquid medium is suitably irradiated, agitated and cooled. Care is taken that the reactants are substantially free from oxygen and any substantial air space above the liquid in the reactor is avoided. The product of the reaction is allowed to flow continuously out of the reactor as formed. The reactor is preferably maintained completely full of reaction product in order to avoid any possibility of a large gaseous space which might be filled with explosive mixtures of gases in case the irradiation ceased. It is not necessary to exactly maintain the above 1:2 molar ratio of acetylene to chlorine. However, if less acetylene is used, there is danger of carbon formation in the reactor which should be avoided so that the reaction mixture will remain transparent at all times. In case a higher ratio of acetylene is used, no harm is done but the acetylene escapes from the reactor and constitutes a recovery problem. It is of greatest importance that both acetylene and chlorine are substantially free from oxygen, as I have found that oxygen strongly inhibits not only the addition of chlorine to acetylene to form acetylene tetrachloride but also the formation of pentachlorethane and beta-trichlorethane. The temperature of operation for carrying out my invention is not critical. I have secured substantial quantities of both pentachlorethane and beta-trichlorethane by operating at temperatures as high as 80° C. or as low as 0° C. For convenient operation, temperatures of the order of 30–60° C. are preferable. The source of light employed is likewise not critical as I have successfully used tungsten filament bulbs, mercury vapor lamps rich in ultra-violet radiation and various fluorescent light sources with satisfactory results. Thus, I may utilize any light from ultraviolet through the visible range. The rate of reaction is primarily dependent upon the efficiency of light application, of stirring, and of cooling. A commercially feasible rate is one which results in the formation of an amount of product equal to the entire contents of the reaction vessel, each 12 to 15 hours.

As an example of the practice of my invention, the following may be cited:

Example 1

A glass-lined closed reactor was fitted with an inlet tube for chlorine, an inlet tube for acetylene, a stirrer, a thermometer well, a light well, an overflow line passing through a liquid seal into a receiver, and with a vent line passing through a reflux condenser to a suitable absorption system. This reactor was jacketed to allow for either cooling or heating. The reactor was charged with 1820 parts acetylene tetrachloride and the contents were heated to 50° C. At this point, the source of light was turned on, and substantially oxygen-free chlorine and acetylene were fed to the stirred contents of the reactor, while the temperature was maintained at 50–55° C. A smooth reaction took place when the chlorine and acetylene feeds were regulated at a 2:1 molar ratio. Essentially no off-gas was secured. The small quantity of off-gas which escaped contained no chlorine and consisted of a mixture of acetylene and hydrogen chloride. After 15 hours operation, 1966 parts of product had been made. This water-white product was then fractionally distilled. After correcting for the initial amount of acetylene tetrachloride charged, this product was found to have the following composition:

| | Per cent |
|---|---|
| Beta-trichlorethane | 18.7 |
| Pentachlorethane | 35.4 |
| Tetrachlorethane | 41.2 |
| Low and high boiling point products | 4.7 |

In other similar experiments, the variation in beta-trichlorethane content ranged between 12 and 25%, the variation of pentachlorethane between 18 and 60%, and of tetrachlorethane between 11 and 60%.

The following examples show the adverse effect of oxygen on the reaction:

Example 2

In order to illustrate the effect of oxygen upon the reaction, the experiment of Example 1 was repeated, using chlorine containing 1.0% of oxygen. It was found impossible to operate the reactor at even half its former rate, while frequent carbonization occurred at the chlorine and acetylene inlets. After 37 hours operation, only 1835 parts of product had been formed, and a large amount of off-gas (mainly acetylene and hydrogen chloride) was evolved. Analysis of the product, after correction for the tetrachlorethane initially present was as follows:

| | Per cent |
|---|---|
| Beta-trichlorethane | 4.0 |
| Pentachlorethane | 30.8 |
| Tetrachlorethane | 51.9 |
| Low and high boiling point products | 12.9 |

The presence of appreciable side reactions, and the marked repression of the formation of beta-trichlorethane is evident from the above data.

The separation of the three major products of my invention is relatively simple because of the difference in boiling point of the chlorohydrocarbons involved, namely, 113.5° C. for beta-trichlorethane, 146.3° C. for tetrachlorethane, and 161.9° C. for pentachlorethane.

Large amounts of catalytic substances, as usually employed for liquid phase chlorination of acetylene, e. g. iron or iron chloride, antimony pentachloride and the like, should be avoided in order to secure the desired formation of pentachlorethane and trichlorethane. Preferably, in practicing my invention, I keep the reaction mixture substantially free of such catalytic substances and rely upon light as the sole catalytic agency.

I claim:

1. The process which comprises reacting acetylene and chlorine in the liquid phase in a liquid mixture having substantially the composition of about 11 to 60% of tetrachlorethane, about 18 to 60% of pentachlorethane and about 12 to 25% of beta-trichlorethane, under the influence of light from ultraviolet through the visible range at a temperature of about 0 to 80° C., while maintaining the reaction mixture substantially free from oxygen and catalytic substances.

2. The process according to claim 1 in which the molar ratio of chlorine to acetylene is approximately 2 to 1.

3. The process which comprises continuously passing chlorine and acetylene in the molar ratio of approximately 2 to 1 into a liquid mixture having substantially the composition of about 11 to 60% of tetrachlorethane, about 18 to 60% of pentachlorethane and about 12 to 25% of beta-trichlorethane, under the influence of light from ultraviolet through the visible range, at a temperature of about 30 to 60° C. while maintaining the reaction mixture substantially free from oxygen and catalytic substances.

4. The process which comprises continuously passing chlorine and acetylene in the molar ratio of approximately 2 to 1 into a liquid mixture having substantially the composition of about 11 to 60% of tetrachlorethane, about 18 to 60% of pentachlorethane and about 12 to 25% of beta-trichlorethane, under the influence of light from a tungsten filament electric lamp at a temperature of about 30 to 60° C., while maintaining the reaction mixture substantially free from oxygen and catalytic substances.

5. The process which comprises continuously passing chlorine and acetylene in the molar ratio of approximately 2 to 1 into a liquid mixture having substantially the composition of about 11 to 60% of tetrachlorethane, about 18 to 60% of pentachlorethane and about 12 to 25% of beta-trichlorethane, under the influence of light from ultraviolet through the visible range, at a temperature of about 30 to 60° C., in a closed container substantially completely filled with said mixture and continuously flowing liquid chlorination products from said container at the rate of formation, while maintaining the reaction mixture substantially free from oxygen and catalytic substances.

6. The process which comprises continuously passing chlorine and acetylene in the molar ratio of approximately 2 to 1 into a liquid mixture having substantially the composition of about 11 to 60% of tetrachlorethane, about 18 to 60% of pentachlorethane and about 12 to 25% of beta-trichlorethane, under the influence of light from a tungsten filament electric lamp at a temperature of about 30 to 60° C., in a closed container substantially completely filled with said mixture and continuously flowing liquid chlorination products from said container at the rate of formation, while maintaining the reaction mixture substantially free from oxygen and catalytic substances.

OLIVER W. CASS.

REFERENCES CITED

The following references are of record in the file of this patent:

UNITED STATES PATENTS

| Number | Name | Date |
|---|---|---|
| 908,051 | Voigt | Dec. 29, 1908 |
| 1,030,916 | Ornstein | July 2, 1912 |
| 1,036,224 | Haberland et al | Aug. 20, 1912 |
| 2,174,737 | Coleman et al | Oct. 3, 1939 |